(No Model.) 5 Sheets—Sheet 1.
J. R. CUMMINGS.
COMBINED STEREOTYPE PLATE TRIMMING, BEVELING, AND SHAVING MACHINE.
No. 465,351. Patented Dec. 15, 1891.
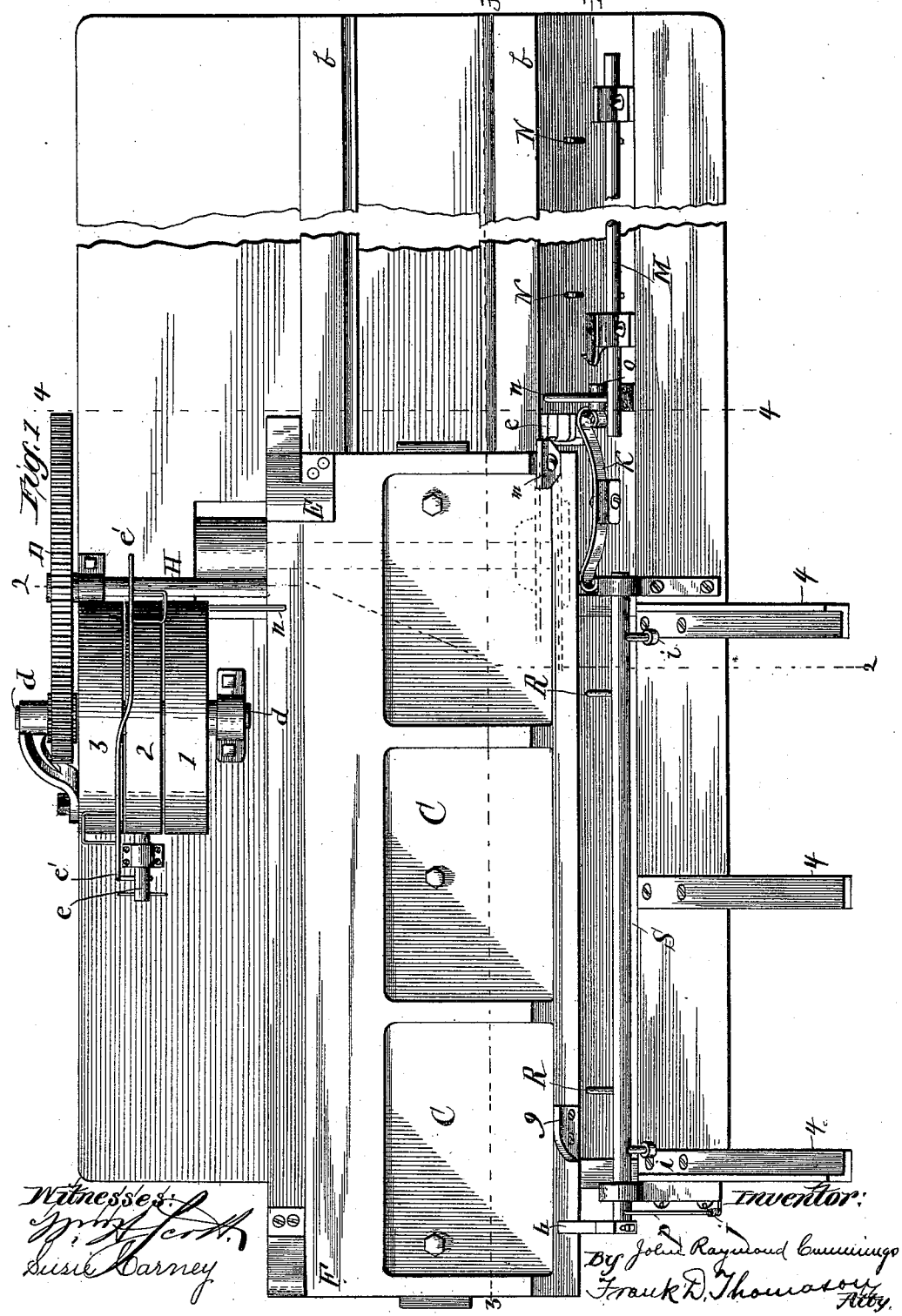

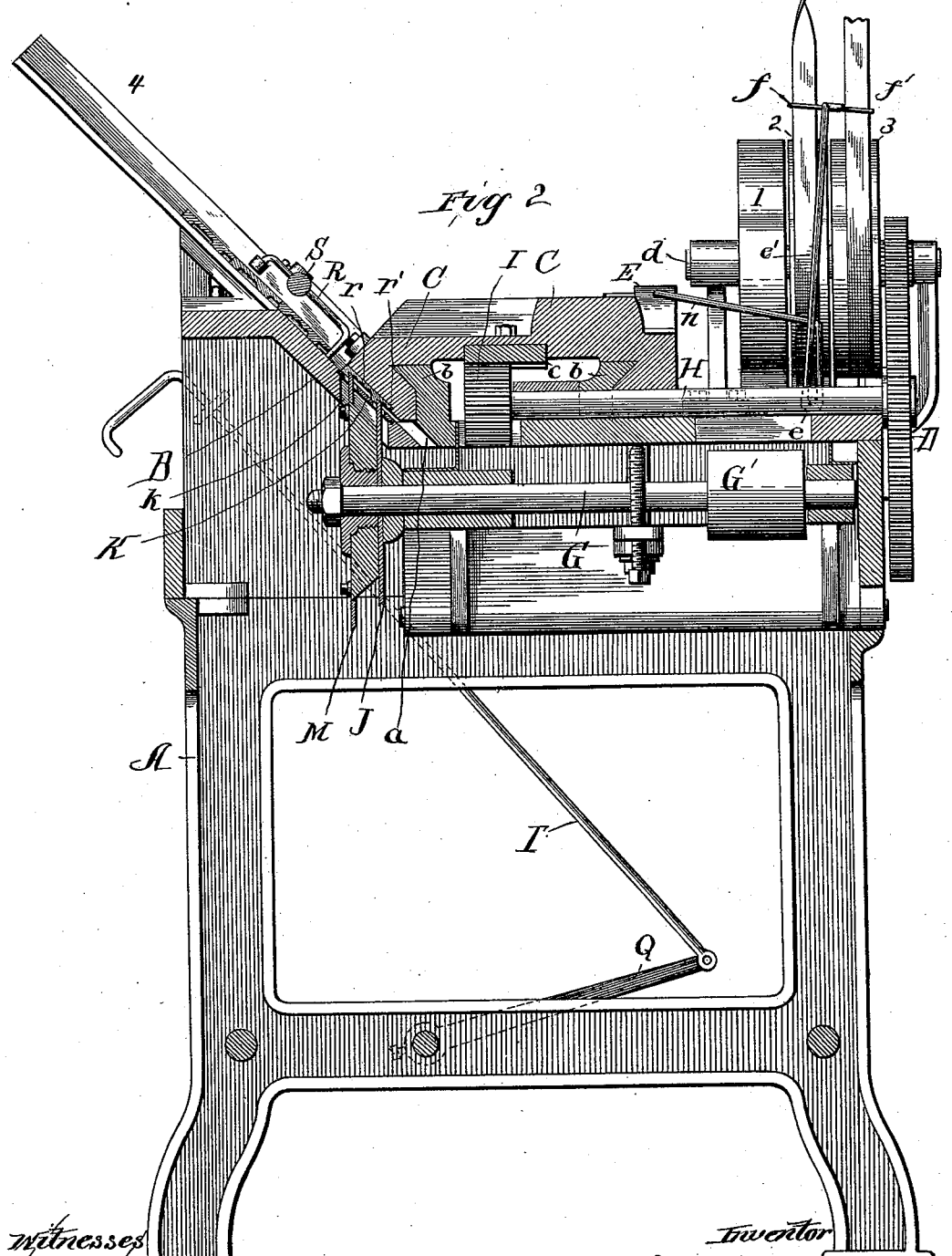

(No Model.) 5 Sheets—Sheet 3.
J. R. CUMMINGS.
COMBINED STEREOTYPE PLATE TRIMMING, BEVELING, AND SHAVING MACHINE.
No. 465,351. Patented Dec. 15, 1891.
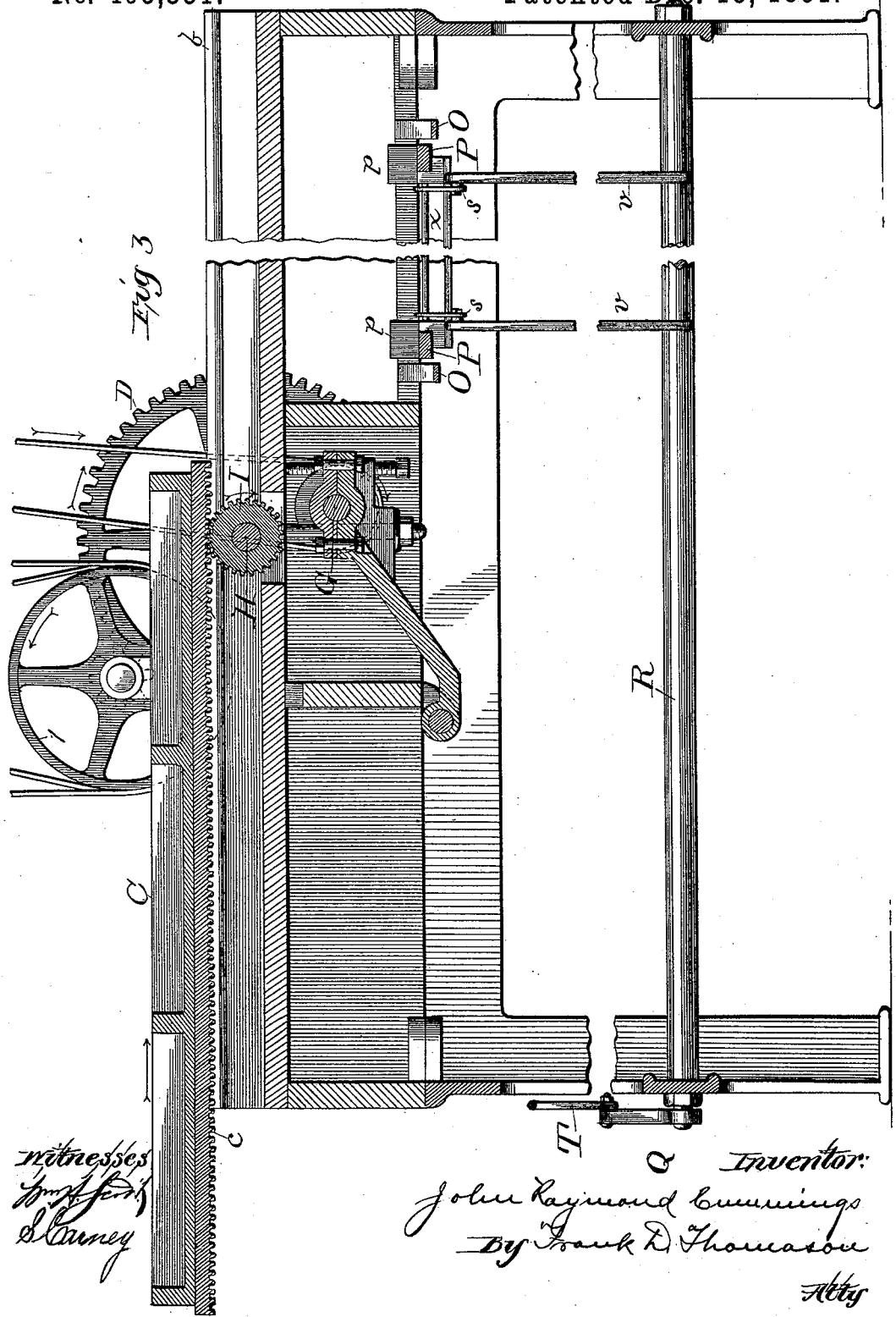

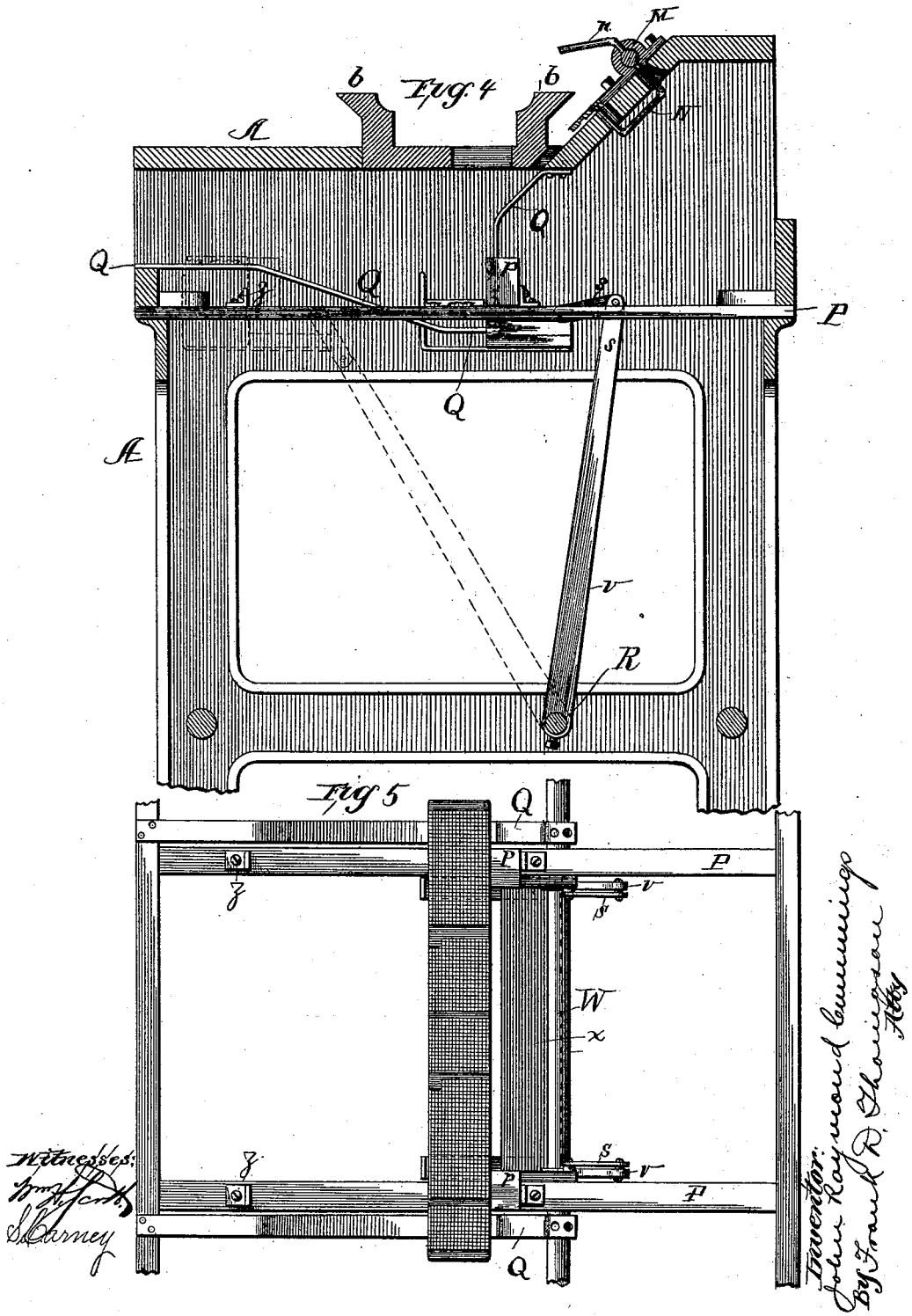

(No Model.) 5 Sheets—Sheet 5.
J. R. CUMMINGS.
COMBINED STEREOTYPE PLATE TRIMMING, BEVELING, AND SHAVING MACHINE.
No. 465,351. Patented Dec. 15, 1891.
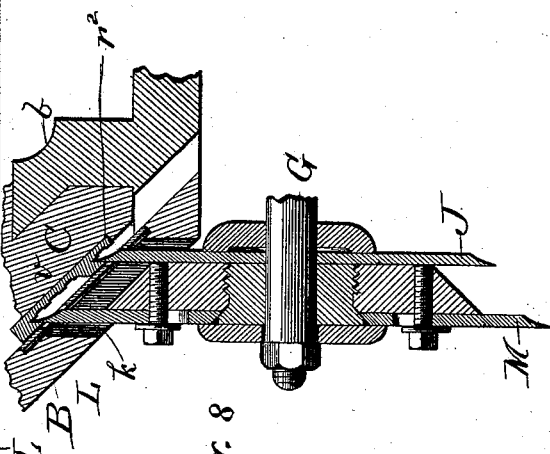
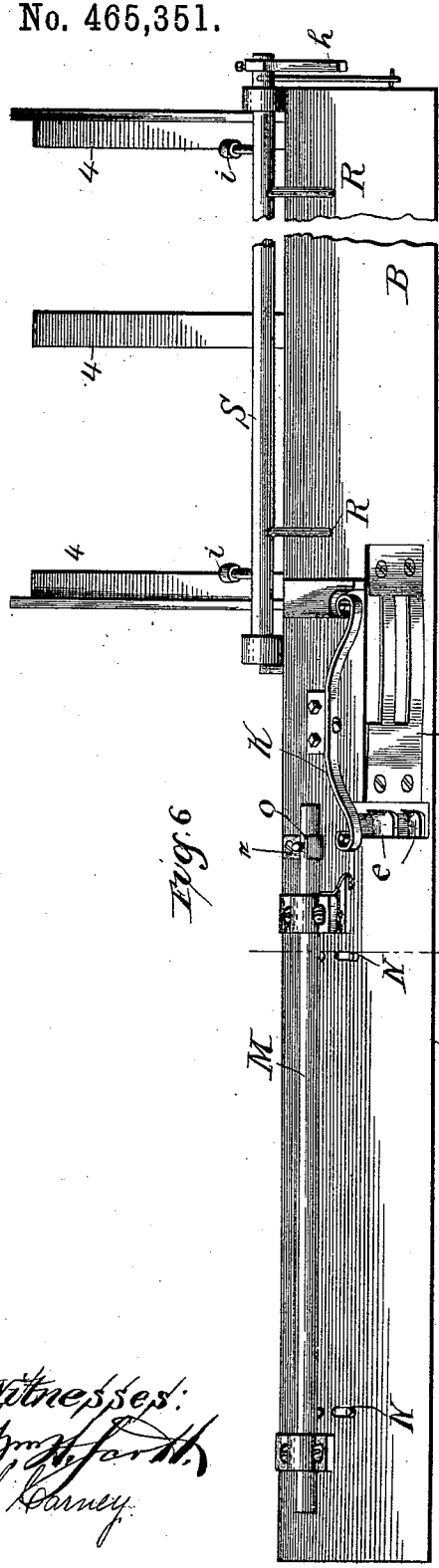
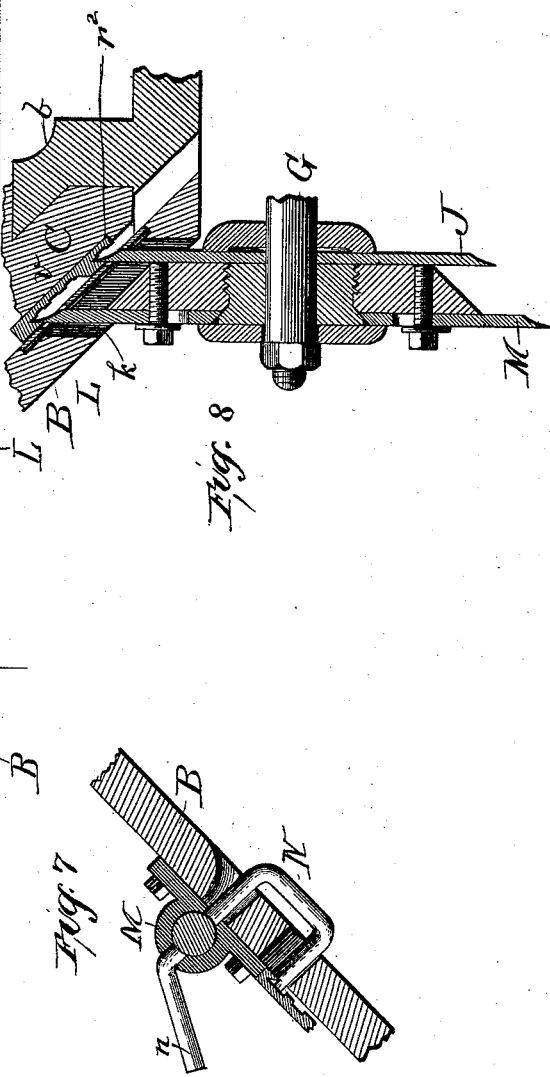
Witnesses:
Inventor:
John Raymond Cummings
By
Frank D. Thomason Atty

UNITED STATES PATENT OFFICE.

JOHN RAYMOND CUMMINGS, OF CHICAGO, ILLINOIS.

COMBINED STEREOTYPE-PLATE TRIMMING, BEVELING, AND SHAVING MACHINE.

SPECIFICATION forming part of Letters Patent No. 465,351, dated December 15, 1891.

Application filed February 24, 1891. Serial No. 382,386. (No model.)

*To all whom it may concern:*

Be it known that I, JOHN RAYMOND CUMMINGS, of Chicago, in the county of Cook and State of Illinois, have invented certain new and useful Improvements in Combined Stereotype-Plate Trimming, Beveling, and Shaving Machines, of which the following is a full, clear, and exact description, reference being had to the accompanying drawings, and to the letters and figures of reference marked thereon.

The object of my invention is to take stereotype-plates having an impression-surface corresponding to the dimensions of a column of newspaper matter, and to feed them automatically to saws that make the necessary under-cut in the sides of the interlocking lugs depending down from the under side of the same. At the same time my invention shaves the under surface of the plate and reduces it to the desired thickness, and after thus finishing the plate takes it from the carrier and lets it slide onto suitable ways, upon which it can be moved to the side of the machine so as to be within convenient reach for removal by means of suitable mechanism under the control of the operator, substantially as hereinafter fully described, and as illustrated in the drawings, in which—

Figure 1 shows a plan view of my improved machine. Fig. 2 shows a transverse vertical section taken on dotted line 2 2, Fig. 1, looking toward the rear of the machine. Fig. 3 shows a longitudinal vertical section taken on dotted line 3 3, Fig. 1, looking toward the bed of the machine. Fig. 4 is a transverse vertical section taken on dotted line 4 4, Fig. 1, looking toward the forward end of the machine and showing a side elevation of the delivery mechanism. Fig. 5 shows a plan view of said delivery mechanism. Fig. 6 shows a plan view of the bed of my machine, together with the devices that are attached thereto separated from the remainder of the machine. Fig. 7 is a detail view showing a cross-section of the devices that take the completed stereotype from the carrier and hold it while the carrier is making its return movement. Fig. 8 is a transverse section through the saws used in my machine, together with a small portion of the bed and carrier.

A brief *résumé* of the action of my improved machine will, it is thought, greatly assist in the comprehension of the detail description following.

The stereotype-plates which this particular type of my machine is especially adapted to finish is shown in the unfinished state in Fig. 2 of the drawings and in the finished state in Figs. 2 and 8. As a reference to said Fig. 2 will show, the separated columns of stereotyped matter are placed side by side upon an inclined feed-rack, from which they are released one at a time, and gravitate into a suitable seat made with reference thereto in the carrier. This carrier pushes the stereotype over the bed to and past the saws and the shaving-knives, by which they are finished, and when it has reached the limit of its forward movement leaves the stereotype in the possession of suitable devices, which, when the carrier has nearly reached the limit of its return movement, releases the plate and permits it to gravitate down the incline of the bed onto ways or tracks, on which it can be pushed toward one side of the machine to within easy reach for removal by means of mechanism controlled by the operator.

The parts of my machine are supported by a table-frame A, of the usual construction. It has running centrally and longitudinally over its top tracks $b$ $b$, which have their outer side surfaces undercut, as shown. Moving on these tracks $b$ is the carrier C, the right-hand side of which, as shown in Fig. 2, is provided with an upper and under bevel. The under bevel $C'$ is recessed, so as to form a seat $r$ of a depth corresponding to the thickness of the plate to be finished and of a corresponding length and breadth, and so located as to be open for the reception of a stereotype-plate when the carrier is at the limit of its return movement preparatory to making its forward movement. In order that the stereotype may gravitate into this seat $r$ when the carrier is about to make its forward movement, and in order to hold the said stereotype in place in said seat, I provide an inclined bed B, the surface of which is inclined, so as to correspond to the plane of the under bevel of the carrier in which the seat $r$ is made, and which is removed therefrom just the necessary distance to keep the stereotype in its seat, as shown. This inclined bed B extends longitudinally the entire length of the machine. It has arising from it in a lateral direction near the rear of the machine a feed-rack, which consists of, preferably, three bars 4 4 4, the two outside ones of which are made of angle-iron with their vertical portions arising from the outer longitudinal edge thereof, so as to prevent longitudinal play of and so as to serve as an end gage for the stereotype-plates placed thereon, as shown. These bars 4 extend above the machine a corresponding distance, and their incline corresponds and is in alignment with the incline of the bed. The stereotype-plates, therefore, when released one at a time (as will hereinafter be more fully explained) gravitate down a continuous incline into the seat $r$ in the carrier.

Carrier C on the side thereof next the bed has a block $g$ secured thereto at a point nearer its rear end, which is provided with a cam upper edge made by rounding its rear end, as shown in Fig. 1. As the said carrier approaches the limit of its rear movement, this block strikes against an arm $h$ and raises it, and the said arm when it is thus raised causes the rock-shaft S from the rear end of which it projects to turn correspondingly. This rock-shaft S extends longitudinally and is journaled in suitable bearings, so that its plane is just above the point of contact of the feed-rack-bars 4 with the bed B. Projecting from this shaft S are the L-shaped trip-arms R R, which extend toward the bed a given distance, as shown, and then toward and to the bed against which they bear when the said shaft is in its normal position. Projecting from the said shaft in a direction opposite to arms R are the rubber-tipped arms $i\ i$, the extremities of which are bent toward the bars 4. The unfinished plates of stereotyped matter are placed side by side on the feed rack-bars, the lowermost one resting against and prevented from gravitating down the inclined surface of the bed by the arms R. When the said shaft is turned in the manner hereinbefore described, so as to lift the extremities of said arms R off the bed, the lowermost stereotype-plate held thereby slides into the seat $r$ in the carrier. The rubber-tipped extremities of the arms $i$ will, at the same time arms R are raised, bear down upon and hold the next lower plate of stereotyped matter and prevent its following the lowermost one until the carrier moves forward and carries the block $g$ beyond the range of arm $h$, whereupon the shaft automatically returns to its original position, and arms $i\ i$, being raised from the stereotype-plate, permits it to slide down and rest against arms R and to be held by them until the carrier returns to its place of beginning again.

As will be inferred from the preceding description, carrier C has a reciprocal movement on the tracks $b$. This is imparted to it by a pinion I, which engages with a rack $c$, secured longitudinally to its under surface. This pinion I is secured on the contiguous end of a transverse shaft H, which has on its outer end a gear D, that meshes with and is driven by a pinion on the outer end of a drive-shaft $d$. Drive-shaft $d$ is journaled in suitable bearings on top of the table-frame, and is provided between its bearings with a nest of three pulleys 1 2 3, the central one of which is loose and which are engaged by a straight and a crossed belt. It will be readily understood that by shifting said belts so that first the crossed belt and then the straight belt will run on the central loose pulley, (thus bringing one or the other of said belts on pulleys 1 or 3,) the said drive-shaft will travel in the one direction or the other, and thus impel the carrier in a forward or rearward direction. This shifting of the belts may be done by hand. I prefer, however, to do it automatically. I accomplish this by means of a shaft $e$, which is journaled so as to lay longitudinally under pulley 2 at right angles to the drive-shaft. At each end of this shaft $e$ it is provided with vertically-projecting arms $e'\ e'$, which extend to a point higher than the pulleys and have their ends provided with horizontal loops, the loop of one arm passing around one belt—say the straight one—and the loop of the other arm passing around the other belt. Thus when said shaft $e$ is rocked, the belts are shifted according to the direction the said shaft is turned. I rock shaft $e$ by securing on one end of it an arm $n$, which projects therefrom in such direction that its extremity extends to and lies over the adjacent side of the carrier, and the carrier is provided at its forward end with an oblique cam plate E, which is secured to and arises from the carrier in such manner that end of arm $n$ comes under it and is pushed downward thereby when the carrier reaches the limit of its return movement, thus causing the belts to shift and the carrier to start in the opposite direction. The rear end of the carrier is also provided with a cam-plate F, against which the end of arm $n$ strikes and is pushed upward when the carrier reaches the limit of its forward movement, thus turning the said shaft $e$ in the opposite direction and causing the carrier to start on its return movement.

G represents a transverse shaft, which is suitably journaled below the plane of the top of the table-frame A in a vertical plane just in front of the carrier when the latter is at the limit of its return movement. It is driven by means of a small pulley G', which is engaged by a belt connecting it with the main shaft, as shown in the drawings. On the end of this transverse shaft immediately under the bed are the two saws J and M, the inner one of which is of less diameter than the other, and both of which project up through a suitable longitudinally-elongated opening $k$ in the bed, coming immediately under the seat $r$ of the carrier. The uppermost segment of each of these saws project sufficiently above the plane of the bed to cut into the stereotype-plate and to make the under-cut in the sides of the depending lugs of said stereotype; but it will be understood that the depth of the kerf made thereby can be graduated by suitable limited adjustment vertically and longitudinally of the contiguous end of the shaft G.

It is obvious that the stereotype-plate must be held firmly in place in its seat $r$ as it passes over the cutting devices. I accomplish this by means of the bow-shaped spring K, which is secured to the bed at about its center of length in such manner that its ends bear against and prevent any lateral movement of the stereotype as it passes over the saws. I also hold the stereotype, so as to prevent the possibility of any vertical play while passing over the saws by a flexible plate L, which is of such length that it can cover the opening $k$ in the bed, and which has longitudinal slots therein for the saws to pass up through. It is sprung or bowed upward at about its center of length, so as to bear against the under surface of the stereotype, and thus, together with the spring K, holds the stereotype immovably in its seat.

It will be noticed from the drawings that the stereotype-plate I have selected to aid me in illustrating and explaining the action of this machine has two downwardly-depending lugs and that the body of the same between these lugs is very thin. In order to shave this under surface of this body part, I secure knives 1 to the bed at about the forward end of the opening $k$ in the same. These knives are located with reference to the part of the plate to be shaved and with their cutting-edges opposing the forward movement of the carrier. Thus the stereotype-plates are first cut by the saws, and then immediately after shaved by the knives as the carrier continues on its forward movement.

If desired, I can use only one saw in my machine or one saw and one knife. The style of plate being finished on the machine would govern this, however.

When the carrier has reached the limit of its forward movement, the stereotype-plate is lifted slightly off its seat by means of two or more U-shaped arms $n$ $n$, which, as shown in the drawings, and particularly in Fig. 7, project downwardly from a longitudinal rock-shaft M, through a suitable opening made with reference thereto in the bed, and then up again through another opening in the bed under the plate, which it lifts by coming under and catching against one of the depending lugs of the stereotype. The rock-shaft M, from which these U-shaped arms project, is journaled in suitable bearings secured to the bed, and it is rocked by a block $m$ on the forward end of the carrier adjacent to the bed, the under edge of which is beveled at both ends, so as to provide a cam-surface which strikes against and forces downward an arm $n$, projecting laterally from the rear end of said shaft toward the bed. When the said shaft M is thus rocked so as to bring the extremities of the U-shaped arms up under the stereotype to lift the same, it is restored to its normal position by means of a flat spring $o$, secured to the bed and pushing up against said arm $n$. These arms $n$ hold the stereotype until the forward end of the carrier while on its return trip comes opposite the arm $n$, whereupon the block $m$ pushes the arm $n$ down and causes the arms N to withdraw below the plane of the bed and release the stereotype. The bed is made separate from the rest of the top of the machine, and its upper inclined surface continues below the plane of the top. When, therefore, the stereotype is released by the arms N, it slides down the incline below the top of the machine and drops onto the transverse ways Q Q. These transverse ways are placed a given distance apart, and are located with reference to the fall of the stereotype-plate, and they consist of metal bars which are secured at one end to the under side of the bed, and then persue a corresponding downward course a few inches, then extend horizontally a short distance toward the opposite side of the machine, and then incline upward toward and connect with the side rail of the table-frame A on that side of the machine opposite the bed, in which I make an opening of sufficient dimensions through which the said stereotype can be removed. Placed parallel with the ways Q and so that, preferably, they will come on the inner side of the said ways are the transverse bars P P, which connect the lower edge of the side rails of the table-frame A. These bars P constitute tracks for the support and guidance of the push-frames $p$ $p$, which are constructed so as to rest and slide on the bars P. They are of such a height that their upper ends are above the plane of the discharge ends of the ways Q, and in their normal position they are located just to the right of the vertical part of said ways, as shown in Fig. 4. They are connected by a suitable cross-bar $x$, from which there projects laterally the L-shaped stop-arms $z$ $z$, whose office it is to stop the fall of the stereotype and to cause it to fall immediately in front of the frames $p$. When a stereotype-plate is deposited in front of the push-frames, the latter are moved simultaneously toward the side of the machine opposite the bed and push the said stereotype ahead of it up the ways Q to the opening in the side rail of the table-frame A, through which it can be conveniently removed, as shown in Fig. 4 of the drawings. The push-frames are reciprocated through the medium of the arms $v$ $v$, to the outer ends of which they are connected by the links $s$, and the arms $v$ project correspondingly upward from the rock-shaft R, which is journaled in the end frames of the table-frame A, and has its rear end extending through its bearings with an arm Q' projecting therefrom. This arm T has a rod T' pivotally connected thereto, which extends upward through suitable guides with a crook on its upper end to within easy reach of the operator. When it is desired to push the stereotype to the discharge-opening, the operator pushes down upon the rod and then restores the push-frames to their original position by pulling said rod up again to its first position.

What I claim as new is—

1. The combination, with a suitable supporting-frame, an inclined bed, and a revolving or circular saw, the upper cutting segment of which projects up through a suitable opening in said inclined bed, of a reciprocating carrier, as set forth.

2. The combination, with a suitable supporting-frame, an inclined bed, and two revolving saws, the upper cutting-segment of each of which projects up through a suitable opening in said inclined bed, of a reciprocating carrier moving longitudinally over said bed and past said saws, as set forth.

3. The combination, with a suitable supporting-frame, an inclined bed, and two revolving saws, one of which is of a less diameter than the other and the upper cutting-segment of each of which projects up through a suitable opening in said inclined bed, of a reciprocating carrier moving longitudinally over said bed and past said saws, as set forth.

4. The combination, with a suitable supporting-frame, an inclined bed, and a circular saw, the upper segment of which projects up through a suitable opening in said inclined bed, and suitable shaving-knives so located on said bed that their cutting-edges oppose the forward movement of the carrier, of said carrier having a reciprocal movement over and past said saw and knives, as set forth.

5. The combination, with a supporting-frame, a suitable bed, and a circular saw, the upper segment of which projects up through a suitable opening bed, and a suitable shaving-knife so located on said bed that the cutting-edge thereof opposes the forward movement of the carrier, of said carrier having a reciprocal movement over and past said saw and knife, as set forth.

6. The combination, with a supporting-frame, an inclined bed, a circular saw, the upper cutting-segment of which projects up through a suitable opening in said bed, and a flexible plate having elongated openings therein and which covers the said opening in the bed up through which the saw projects, so that the said saw may project through its elongated openings and which is bowed upward, as described, of a longitudinally-reciprocating carrier moving over and past said saw at such a distance from the surface of the bed that the said flexible plate will bear against the stereotype-plate carried by it, as set forth.

7. The combination, with a supporting-frame, an inclined bed, a circular saw, the upper cutting-segment of which projects up through a suitable opening in said bed, a flexible plate bowed upward and covering the opening in said bed, so that the said saw may project up through elongated openings therein, and suitable knives secured to said bed, of a longitudinally-reciprocating carrier, as set forth.

8. The combination, with a supporting-frame, an inclined bed, a circular saw, the upper segment of which projects up through a suitable opening in said bed, and a bow-shaped spring K, of a reciprocating carrier having a suitable seat for the reception of the stereotype-plates, as set forth.

9. The combination, with a supporting-frame, an inclined bed, a circular saw, the upper cutting-segment of which projects up through a suitable opening in said bed, of the bow-shaped spring K and the flexible plate L, as set forth.

10. The combination, with a supporting-frame, an inclined bed thereon, a circular saw, the upper segment of which projects up through a suitable opening in said bed, and the longitudinally-reciprocating carrier moving over said bed and past said saw, of devices for holding the stereotype-plate carried by said carrier when the latter is about at the limit of its forward movement and for releasing the same when the carrier is making its return movement, the transverse way Q, and the push-blocks $p$, as set forth.

11. The combination, with the supporting-frame, an inclined bed, a circular saw, the upper cutting-segment of which projects up through a suitable opening in said bed, and a reciprocating carrier, of the shaft M and arms N, said shaft being actuated by said carrier, and when it is moved it is automatically restored to its normal position, as set forth.

12. The combination, with a supporting-frame, an inclined bed, a circular saw, the upper cutting-segment of which projects up through a suitable opening in said bed, and a reciprocating carrier having a cam-block $m$, of the shaft M, arms N, projecting therefrom, arm $n$, engaged by block $m$, and spring $o$, as set forth.

13. The combination, with a supporting-frame, an inclined bed, a circular saw the upper cutting-segment of which projects up through a suitable opening in said bed, and a longitudinally-reciprocating carrier, of the shaft M, actuated by said carrier and automatically restored to its original position after being moved, the arms N, projecting therefrom, the ways Q, and push-blocks $p$, as set forth.

14. The combination, with a supporting-frame, an inclined bed, a circular saw, the upper cutting-segment of which projects up through a suitable opening in said bed, and a reciprocating carrier, of the ways Q and the transversely-movable push-blocks $p$ $p$, as set forth.

15. The combination, with a supporting-frame, an inclined bed, a circular saw, the upper cutting-segment of which projects up through a suitable opening in said bed, and the feed-rack, the incline of which is such that the stereotype - matter placed thereon gravitates down the same, of a reciprocating carrier having a seat in the surface thereof facing the inclined bed, as set forth.

16. The combination, with a supporting-frame, an inclined bed, a circular saw, the upper cutting-segment of which projects up through a suitable opening in said bed, a feed-rack, substantially as described, rock-shaft S, and trip-arms R, of a reciprocating carrier, as set forth.

17. The combination, with a supporting-frame, an inclined bed, a circular saw, the upper cutting-segment of which projects up through a suitable opening in said bed, a feed-rack, substantially as described, a rock-shaft S, trip-arms R, and the buffer-arms $i$, of the reciprocating carrier, as set forth.

18. The combination, with a supporting-frame, an inclined bed, a circular saw, the upper cutting-segment of which projects up through a suitable opening in said bed, a feed-rack, substantially as described, rock-shaft S, trip-arms R, buffer-arms $i$, and arm $h$ on the rear end of said shaft, of the reciprocating carrier and cam-block $g$ thereon, as set forth.

19. The combination, with a supporting-frame, an inclined bed, a circular saw, the upper cutting-segment of which projects up through a suitable opening in said bed, and a longitudinally-reciprocal carrier, of the ways Q Q, the push-blocks $p\ p$, the links $s\ s$, connected thereto, the arms $v\ v$, pivotally connected to the other ends of said links and projecting from a rock-shaft W, said shaft W, an arm Q', projecting from the rear end thereof, and the rod T, as set forth.

JOHN RAYMOND CUMMINGS.

Witnesses:
CHAS. H. EVANS,
FRANK D. THOMASON.